Patented May 25, 1926.

1,586,046

UNITED STATES PATENT OFFICE.

ZENOS P. ROMERILL, OF OGDEN, UTAH.

NONCONDUCTING PLASTIC COMPOSITION.

No Drawing.   Application filed November 1, 1923.   Serial No. 672,157.

The invention relates to plastic compositions to be applied to the surfaces of walls, exteriorly and interiorly, and the ceilings of all classes of buildings, to render the walls and ceilings impervious to moisture and to the radiation of heat and cold and to also make them fire-proof.

The invention also may be applied to the outer walls of hot water and steam boiler furnaces, to the outer sides of steam boilers and may be used as a lagging for conduits for steam, hot water, refrigerating liquids, etc., to add to the efficiency of such structures.

The composition consists of a mixture of disintegrated and weathered siliceous and calcareous rock with vegetable matter intermixed, magnesite, asbestos sand and chloride of magnesia.

The ingredient herein referred to as a mixture of disintegrated and weathered siliceous and calcareous rock with vegetable matter intermixed is a natural product found in beds or deposits in the State of Utah.

In preparing the composition I prefer to use the ingredients named in about the following proportions, viz:

Disintegrated and weathered siliceous and calcareous rock with vegetable matter intermixed 60 pounds; magnesite (calcined) 25 pounds; asbestos 15 pounds; sand 25 pounds; magnesium chloride, 20 sp. gr. Baumé 10 gallons.

These ingredients are mixed with sufficient water to form a paste or mortar of such consistency that it may be spread over the surface to be heated and will adhere thereto. It may be applied in one or more coats or layers as may be necessary, the number of coats or layers and the thickness of the completed coating being determined by the nature of the structure treated and the amount of protection required.

Furthermore the relative proportions of the ingredients named may be varied within the proportions hereinafter stated depending on the nature of the surface to be treated, good results being obtained by such variation. The variations may be as follows:

|  | Pounds. |
|---|---|
| Disintegrated or weathered siliceous and calcareous rock with vegetable matter intermixed | 20 to 85 |
| Magnesite (calcined) | 10 to 55 |
| Asbestos | 3 to 35 |
| Sand | 5 to 50 |

The specific gravity of the magnesium chloride may vary between 7 to 35 Baumé and the quantity used from 3 to 20 gallons.

The composition is light; is fire-proof; is a very efficient non-conductor of heat and cold, it will adhere without cracking when it dries onto the surface to which it may be applied, and possesses in a high degree all the desired properties of a lagging for steam heated surfaces, and an efficient non-conducting and fire-proof covering for walls, ceilings, etc. of buildings where it may be applied. Sand may also be omitted.

I claim:—

A plastic composition containing the following ingredients in the proportions stated: weathered siliceous and calcareous rock in disintegrated condition with vegetable matter intermixed, sixty pounds, calcined magnesite, twenty-five pounds, asbestos, fifteen pounds, sand twenty-five pounds, and magnesium chloride, ten gallons.

In testimony whereof I affix my signature.

ZENOS P. ROMERILL.